United States Patent [19]
Nicaise et al.

[11] 3,985,767

[45] Oct. 12, 1976

[54] PROCESS FOR THE PREPARATION OF COPPER PHTHALOCYANINE

[75] Inventors: Jean-Claude René Nicaise, Creil; Louis Antoine Cabut, Nogent sur Oise, both of France

[73] Assignee: Produits Chimiques Ugine Kuhlmann, Paris, France

[22] Filed: June 11, 1974

[21] Appl. No.: 478,423

[30] Foreign Application Priority Data
June 20, 1973  France ........................... 73.22421

[52] U.S. Cl. ........................... 260/314.5; 106/288 Q
[51] Int. Cl.$^2$ .................................. C09B 47/04
[58] Field of Search ............................... 260/314.5

[56] References Cited
UNITED STATES PATENTS

| | | | |
|---|---|---|---|
| 2,160,837 | 6/1939 | Detrick | 260/314.5 |
| 2,197,458 | 4/1940 | Wyler | 260/314.5 |
| 2,214,477 | 9/1940 | Riley | 260/314.5 |
| 2,216,868 | 10/1940 | Wyler | 260/314.5 |
| 2,302,612 | 11/1942 | Lacey | 260/314.5 |
| 3,074,958 | 1/1963 | Fleysher | 260/314.5 |
| 3,642,815 | 2/1972 | Spietschka et al. | 260/314.5 |
| 3,763,182 | 10/1973 | Horiguchi et al. | 260/314.5 |
| R23,304 | 12/1950 | O'Neal | 260/314.5 |

FOREIGN PATENTS OR APPLICATIONS

410,814  5/1934  United Kingdom ............. 260/314.5

OTHER PUBLICATIONS

Lange, Handbook of Chemistry, 10th Ed., pp. 216–219 (1961).
Nebergall et al., General Chemistry, p. 531 (1959).
Moser et al., Phthalocyanine Compounds, pp. 106–107 (1963).

*Primary Examiner*—Harry I. Moatz
*Attorney, Agent, or Firm*—Beveridge, DeGrandi, Kline & Lunsford

[57] ABSTRACT

A process for the preparation of copper phthalocyanine which comprises heating 4 moles of phthalodinitrile with about 1 mole of cuprous chloride at a temperature of from 140° to 300°C. in the presence of 10% to 30%, with respect to the weight of phthalodinitrile, of an ammonium salt which decomposes at a temperature of from 30° to 200°C. with the liberation of ammonia; and copper phthalocyanine prepared by this process.

9 Claims, No Drawings

PROCESS FOR THE PREPARATION OF COPPER PHTHALOCYANINE

The present invention relates to a process for the preparation of copper phthalocyanine.

The preparation of copper phthalocyanine by the reaction of phthalodinitrile with copper salts, especially by the process of agglomeration of the phthalonitrile with monovalent copper chloride (see Ullmanns Encyclopaedia of Technical Chemistry, Vol 13, pages 702 and 703), is known. This process consists of grinding the phthalodinitrile with the monovalent copper chloride and heating the mixture at 150° C. without the addition of solvents or catalysts. Improvements have been made to this process, in particular by the addition of inert mineral salts, such as sodium chloride and anhydrous sodium sulphate, so as to limit the rise of temperature to 200°–210° C. in the course of this exothermic reaction. More recently, with the object of reducing the amount of monovalent copper chloride used and of avoiding the formation of chlorinated phthalocyanine, it has been proposed in French Pat. No. 1,593,917 to heat, at a temperature between 140° and 350° C., 4 moles of phthalodinitrile with about 1 mole of copper monochloride in the presence of 5% to 30%, preferably 10% to 25% by weight of urea, with respect to the amount of phthalodinitrile used. This process, which enables a yield of copper phthalocyanine between 86% and 92% containing only 0.1% to 1% of chlorine to be obtained, has however numerous technical drawbacks. In effect, the mixture of urea, phthalodinitrile and mineral salt melts during the reaction by reason of the considerable rise in the temperature, and solidifies into a very hard mass on cooling. This mass needs grinding in order to be able to be used again later. In addition, the pigments obtained by this process are dull and lustreless, which reduces their interest.

It has now been found that these drawbacks of the agglomeration process can be remedied by replacing the urea with an ammonium salt such as ammonium carbonate, bicarbonate or sulphamate which decomposes at a temperature of from 30° to 200° C., preferably at from 30° to 100° C., with the liberation of ammonia.

The mixture of ammonium salt-phthalodinitrile-copper chloride does not melt even if it is taken to a temperature as high for example as 300° C. After cooling, the product obtained is very friable and can be used as it is, without any grinding, for putting it into pigmentary form.

Further, the pigments prepared from the copper phthalocyanine obtained by the process according to the invention have a brilliancy and colouring power distinctly superior to those obtained from the copper phthalocyanine prepared in the presence of urea.

According to the invention therefore a process for the preparation of copper phthalocyanine is provided which comprises reacting 4 moles of phthalodinitrile with about 1 mole, preferably 1 to 1.2 moles, of cuprous chloride at a temperature of from 140° to 300° C., in the presence of an ammonium salt which decomposes at a temperature from 30° to 200° C. with the liberation of ammonia at the rate of 10% to 30%, preferably 15% to 25%, of the ammonium salt with respect to the weight of phthalodinitrile.

The reaction components are advantageously ground finely and intimately mixed. They can then be deposited on metal sheets or trays and heated in a furnace at the desired temperature.

The condensation reaction which gives the copper phthalocyanine begins at a temperature of from 140° to 150° C. and ends in a few minutes (e.g. 1 to 10 minutes), while releasing large quantities of heat. It is preferable to limit the rise in temperature during the exothermic reaction so that the final temperature does not exceed 220° C. For this purpose, an inert mineral salt such as for example sodium chloride or anhydrous sodium sulphate may be added to the reaction mixture.

After cooling, the crude copper phthalocyanine is in the form of a solid, extremely friable cake, which may be taken up directly at boiling point in dilute hydrochloric acid.

A 95–97% copper phthalocyanine is obtained with a yield of 86% to 92%, which only contains 0.1% to 1% of chlorine and which may be converted into useful pigments by the usual finishing processes.

The invention is illustrated by the following Examples in which the parts are parts by weight unless the contrary is indicated.

EXAMPLE 1

75 parts of phthalodinitrile, 16 parts of anhydrous cuprous chloride, 150 parts of anhydrous sodium sulphate and 15 parts of ammonium carbonate are ground in a rod mill. Then the powdered mixture is heated on a metal plate placed in a furnace. The formation of copper phthalocyanine is effected a few minutes as soon as the temperature of the reaction mass reaches 140° to 150° C. The temperature in the mass rises up to 190° to 200° C. A friable and porous cake is obtained which is then boiled in 1000 parts by volume of 5% hydrochloric acid. The product is filtered hot, and the solid which is separated is washed until the washings are neutral and dried. 74.5 parts of 96% copper phthalocyanine are thus obtained which has a chlorine content of 0.3%.

EXAMPLE 2

75 parts of phthalodinitrile, 16 parts of anhydrous cuprous chloride, 150 parts of anhydrous sodium sulphate and 15 parts of ammonium bicarbonate are ground in a rod mill. The powdered mixture is placed on to a metal tray and heated in an oven at 140° to 145° C. The formation of copper phthalocyanine is effected in a few minutes. The temperature of the reaction mass rises to 190° to 200° C. After cooling, the cake is boiled in 1000 parts by volume of 5% hydrochloric acid, filtered hot, and the separated solid is washed until the washings are neutral and dried. 75 parts of 95% copper phthalocyanine having a chlorine content of 0.4% are thus obtained.

The pigments obtained by grinding, in the presence of solvent starting from the phthalocyanines prepared according to the preceding Examples possess a remarkable brilliance and a very high colouring power when they are applied in paints in a solvent medium. In order to illustrate this fact, one operates as follows:

A mixture of 2 parts of pigment and 10 parts by volume of a binder consisting of 50% of non-drying alkyd resin based on saturated fatty acids (lauric and adipic acids) and 50% of butyl lactate is ground 12 time 25 revolutions under a pressure of 25 kg/cm² by means of a BRAIVE mill. The weight of the paste is then made up to 200 parts by the addition of a nitrocellulose varnish based on nitrocellulose and alkyd resin and homogenised for 5 minutes by means of a Rayneri stirrer. Then 10 parts of the suspension obtained are mixed with 25 parts of a nitrocellulose paint and the mixture is applied on to a layer of aluminium paper in a layer of 0.5 mm thickness by means of a Triplex apparatus. The colourations obtained are then examined by means of a Hardy spectrophotocolorimeter.

The examination of the spectrophotometric curves and their colourimetric interpretation for the illuminant C enables one to evaluate the chromaticity $x$ characterising the shade, the purity $y$ of the shade, the luminosity $\gamma$, the dominating wave length $\lambda d$ (in nanometers: nm) and the purity of extraction $pe$.

The following Table summarises the results obtained in this test using either phthalocyanines obtained in the presence of urea according to the known process or in the presence of ammonium carbonate according to the present invention.

| Urea | ammonium carbonate | x | y | γ | λd (nm) | pe |
|---|---|---|---|---|---|---|
| 20% | | 0.204 | 0.238 | 0.300 | 481.5 | 47.0% |
| | 20% | 0.193 | 0.223 | 0.275 | 480.7 | 52.7% |
| 30% | | 0.201 | 0.237 | 0.311 | 481.6 | 48.2% |
| | 30% | 0.191 | 0.222 | 0.277 | 480.7 | 53.7% |

Examination of these results shows that the pigments obtained in the presence of ammonium carbonate are of a less green shade than those obtained in the presence of urea for which the values of $x$ are higher. The values of $y$ and $\gamma$ are less for the pigments obtained in the presence of ammonium carbonate; the brilliance and colouristic intensity of these pigments are therefore superior to those of the pigments obtained in the presence of urea: this superiority is confirmed by the values of $\lambda d$ and $pe$.

We claim:
1. A process for the preparation of copper phthalocyanine which comprises heating 4 moles of phthalodinitrile with about 1 mole of cuprous chloride at a temperature of from 140° to 300° C in the presence of 10% to 30%, with respect to the weight of phthalodinitrile, of an ammonium salt which decomposes at a temperature of from 30° to 200° C with the liberation of ammonia, the reaction being carried out in the absence of any solvent.
2. A process according to claim 1 in which the ammonium salt is an ammonium salt which decomposes at a temperature of from 30° to 100° C.
3. A process according to claim 1 in which the ammonium salt is ammonium carbonte.
4. A process according to claim 1 in which the ammonium salt is ammonium bicarbonate.
5. A process according to claim 1 in which the ammonium salt is ammonium sulphamate.
6. A process according to claim 1 in which 15% to 25% of ammonium salt is used.
7. A process according to claim 1 in which the rise in temperature is restricted so that the final temperature does not exceed 220° C.
8. A process according to claim 1 which is carried out in the presence of an inert mineral salt.
9. A process according to claim 1 in which 1 to 1.2 moles of cuprous chloride are used.

* * * * *